United States Patent [19]
Kimura

[11] Patent Number: 5,872,985
[45] Date of Patent: Feb. 16, 1999

[54] SWITCHING MULTI-CONTEXT PROCESSOR AND METHOD OVERCOMING PIPELINE VACANCIES

[75] Inventor: Yasunori Kimura, Kawasaki, Japan

[73] Assignee: Fujitsu Limited, Kawasaki, Japan

[21] Appl. No.: 507,992

[22] Filed: Jul. 27, 1995

[30] Foreign Application Priority Data

Nov. 25, 1994 [JP] Japan ................................. 6-290742

[51] Int. Cl.$^6$ ................................................ G06F 13/00
[52] U.S. Cl. .............................. 395/800.01; 395/800.24; 395/800.25; 395/800.26; 395/800.27; 395/376; 395/384; 395/385; 395/386; 395/389; 395/584; 395/585; 395/586
[58] Field of Search ........................... 395/800, 484, 395/394, 586, 800.01, 800.24, 800.25, 800.26, 800.27, 376, 384, 385, 386, 389, 584, 585; 364/DIG. 1

[56] References Cited

U.S. PATENT DOCUMENTS

| | | | |
|---|---|---|---|
| 5,226,126 | 7/1993 | Mcfarland et al. | 395/375 |
| 5,226,130 | 7/1993 | Favor et al. | 395/375 |
| 5,228,131 | 7/1993 | Ueda et al. | 395/375 |
| 5,287,467 | 2/1994 | Blaner et al. | 395/375 |
| 5,428,786 | 6/1995 | Sites | 395/700 |
| 5,442,757 | 8/1995 | Mcfarland et al. | 395/375 |
| 5,487,022 | 1/1996 | Simpson et al. | 364/715.04 |
| 5,553,255 | 9/1996 | Jain et al. | 395/375 |
| 5,584,001 | 12/1996 | Hoyt et al. | 395/585 |
| 5,615,350 | 3/1997 | Hensson et al. | 395/394 |
| 5,619,730 | 4/1997 | Ando | 395/855 |

*Primary Examiner*—Alyssa H. Bowler
*Assistant Examiner*—Dzung Nguyen
*Attorney, Agent, or Firm*—Armstrong, Westerman, Hattori, McLeland & Naughton

[57] ABSTRACT

An instruction executing section supplies an instruction of a certain context to a pipeline and executes the context. When a vacancy of the pipeline is judged, the instruction executing section switches the context to another context which is being executed, thereby simultaneously executing a plurality of contexts. An ID setting section sets a peculiar context ID to each of the plurality of contexts which are simultaneously executed by the instruction executing section. A register renaming section executes a multi-renaming such that a register name which is used when the plurality of contexts are simultaneously executed by the instruction executing section is renamed to a register name CIDi-Rj obtained by adding a designation register name Rj (j=1, 2, 3, . . . , m) of an execution instruction to CIDi as a context ID which was set by an ID setting section and whose context is being executed and the physical register is allocated.

34 Claims, 12 Drawing Sheets

SWITCHING MULTI-CONTEXT PROCESSOR AND METHOD OVERCOMING PIPELINE VACANCIES

BACKGROUND OF THE INVENTION

The invention relates to a processor having an architecture of a super scalar and its processing method. More particularly, the invention relates to a processor for supporting a multi-context in which a plurality of contexts are simultaneously allowed to flow in a pipeline and are executed and its processing method.

First, a multi-context which is used in the invention will be described. First, the context is defined as "an execution unit on a computer to execute a certain group of works having a certain meaning". The context includes processes of different address spaces of the UNIX and a thread of the same address space in the MACH. Namely, a plurality of contexts don't care about a problem about whether they have independent memory spaces or the same memory space but incorporate both of those cases. The multi-context, therefore, is a set of a plurality of contexts which can be simultaneously executed. A processor to support the multi-context of the invention intends to efficiently input a plurality of contexts to a pipeline and to execute them.

Hitherto, codes which were compiled to a single instruction train from a single user program are generally inputted to a pipeline of the super scalar processor and, upon execution, a parallel performance is extracted by a hardware and the instructions are executed in parallel. According to this method, however, in the case where there is a dependency relation between the instructions, the case where a mishit occurs in a cache, the case where a branch instruction is executed, or the like, the execution is interrupted and a vacancy occurs in the pipeline. Such a phenomenon is called a stall of the pipeline or the occurrence of a bubble of the pipeline. Therefore, the performance which the processor inherently has cannot be fully used. Accordingly, in order to solve the stall of the pipeline, there is a method whereby an instruction train of a plurality of processes is inputted to the pipeline at a certain predetermined interval and the stalls of the pipeline which are caused from the mutual instruction trains are set off. According to this method, however, since a switching interval of the instruction train is constant, a scheduling using a nature of the program cannot be performed and an effect of the elimination of the stall is small. To simultaneously execute a plurality of contexts, registers each for holding an execution environment of each context of the number as many as the number of contexts have to be provided, so that a large quantity of resources are consumed. On the contrary, in case of dividing certain predetermined resources to the contexts and of using them, there is a drawback such that the resources which can be used by one context are reduced.

An HEP will now be described as an example of the above method. As shown in FIG. 1, the HEP is a method whereby a plurality of instruction streams are mechanically inputted to a pipeline one instruction by one and its mechanism is simple. In FIG. 1, (n) programs are simultaneously inputted to one pipeline. Each of the programs (1 to n) denotes a context of the invention. Upon execution, the instructions are sequentially inputted to a pipeline 200 in accordance with the following order and are executed.

Instruction 1 of the program 1
Instruction 1 of the program 2
Instruction 1 of the program n
Instruction 2 of the program 1

The pipeline 200 is constructed by four stages. A fetching stage (F) fetches an instruction from a cache. A decoding stage (D) decodes the instruction. An executing stage EX (Execute) executes the instruction. A storing stage (S) (Store) stores the execution result. Now, assuming that the instruction 1 of the program 1 is a load instruction and an instruction 2 of the program 1 uses the result loaded by the instruction 1, in the case where the instruction is executed by only the program 1, a stall of the pipeline occurs between the instructions 1 and 2. Generally, since the load instruction accesses a memory, the loading result cannot be used in the cycle just after, so that a stall of the pipeline occurs. In case of the HEP of FIG. 1, since the execution of the instruction 1 of the programs 1 to (n) is sandwiched between the execution of the instruction 1 of the program 1 and the execution of the instruction 2 of the program 1. Therefore, the stall of the pipeline 200 in the case where the instruction 1 of the program 1 is a load instruction is effectively eliminated and a throughput of the execution of the program can be raised. However, when the instructions are inputted to the pipeline 200, since the relation among the instruction streams of the plurality of programs 1 to (n) is not considered, there is no guarantee such that the occurrence of the stall of the pipeline 200 can be always reduced. Further, the work registers of only the number corresponding to the number of contexts (programs) which simultaneously operate upon execution must be prepared and a request for the number of registers increases. On the contrary, when the number of registers which can be prepared by the hardware is fixed, the number of registers which can use one context decreases. In the example of the HEP of FIG. 1, the register sets of the number as many as the (n) programs must be simply prepared at a time. Further, according to such a simple inputting method of the instruction stream, there is a large possibility such that hit ratios of an instruction cache and a data cache deteriorate. On the other hand, as another method of solving the stall of the pipeline, there is also a method whereby program units which can be executed in parallel called threads are extracted from a single program and they are simultaneously inputted to the pipeline and are executed. In many cases, however, such a method can be applied to only the simple case such that a loop of a numerical value calculating program written by the FORTRAN or the like is set to one thread. It is very difficult to extract the threads by a compiler for a general program.

SUMMARY OF THE INVENTION

According to the invention, a processor for supporting a multi-context in which a stall of a pipeline of a super scalar processor is reduced and a plurality of contexts are simultaneously efficiently inputted to the pipeline and a performance is improved and its processing method are provided.

A plurality of contexts as an execution unit to execute a certain group of works of a certain meaning have been stored in a context storage section (memory space) such as a cache memory or the like. An instruction executing section supplies an instruction of a certain context to the pipeline and executes. When a vacancy of the pipeline is judged, the instruction executing section switches the context to another context that is being executed and, at the same time, executes a plurality of contexts. An ID setting section sets CIDi (i=0, 1) as a peculiar context ID to each of a plurality of contexts which are simultaneously being executed by the instruction executing section. A register renaming section renames a register name which is used when a plurality of contexts are simultaneously executed by the instruction executing section to a register name CIDi-Rj obtained by adding a designated register name Rj (j=1, 2, 3, . . . , m) of the execution instruction to CIDi as a context ID during execution which was set by the ID setting section and allocates physical registers. The register renaming section executes a multi-register renaming necessary to execute all of the contexts by only the physical registers of one context when a plurality of contexts are simultaneously supplied to the pipeline.

The switching of the contexts is performed by a combination of a hardware and a software or by only a hardware. In case of switching the context by the combination of the hardware and software, the instruction train constructing the context has not only a program code but also an attribute information field for storing various information to assist the execution of the program code although the meaning of the program code is not changed. Instruction execution information necessary to execute a subsequent instruction which provides a timing for switching to another context that is being executed is stored in the attribute information field. As a subsequent instruction which provides a timing for context switching, there are a load instruction and a branch instruction. When the subsequent instruction is a load instruction, an attribute information field of a precedent instruction code having an interval of a latency which is caused until the data reaches from the memory by the execution of the load instruction is provided with attribute information to instruct an instruction fetch of another context during the execution simultaneously with the execution of the above instruction. In the case where the subsequent instruction is the branch instruction as well, the attribute information field of the precedent instruction code having an interval of the latency until the data reaches from the memory by the execution of the branch instruction is also similarly provided with the attribute information to instruct the instruction fetch of another context which is being executed simultaneously with the execution of the above instruction. For the context switching using the attribute information, the instruction executing section has at least two instruction buffers. There are also provided: a first router for switching a prefetch route to prefetch the instruction to either one of instruction buffers from either one of the plurality of contexts; and a second router for switching a fetch route to fetch to the pipeline from either one of instruction storage buffers. When instruction execution instructing information necessary to execute the subsequent instruction serving as a timing for switching to another context which is being executed is decoded from the attribute information of the instruction of the context which is at present supplied to the pipeline, the context switching section switches the prefetch route of the first router from the context on the switching destination side to the prefetch route to another instruction buffer which is not used at present for instruction fetching, thereby allowing the instruction to be prefetched. Subsequently, when the execution of the subsequent instruction serving as a timing for switching to another context is judged, the context switching section switches the fetch route of the second router to the instruction buffer on the side on which the prefetch route was switched by the first router, thereby allowing the instruction of another prefetched context to be prefetched to the pipeline.

In case of switching the context by the hardware, the instruction executing section recognizes the subsequent instruction serving as a timing for switching to another context which is being executed from the signal of the hardware in association with the execution of the subsequent instruction and switches the context. For example, when the subsequent instruction is the load instruction, the context switching is recognized from a signal indicative of the mishit of the cache in the execution of the load instruction. When the subsequent instruction is the load instruction, the context switching is recognized from an output of a branch target buffer indicative of the time when a branch condition in the execution of the load instruction is satisfied (taken).

The register renaming section to realize a multi-renaming function comprises: an ID register to store the ID of the context which is being executed; an instruction register to fetch the instruction of the context which is being executed; and a renaming register file having a plurality of physical registers each including a valid flag field, a register key field, and a data field. A register allocating section forms a register key CIDi-Rj in which the register name Rj of the register designation field of the instruction register is added to CIDi as a context ID of the ID register and allocates the corresponding physical register of the register file as a renaming register. The data of the renaming register which overflowed from the register file is saved to a register saving section provided every context whose saving operation is being executed by a save processing section. In the case where it is judged that the register corresponding to the register key CIDi-Rj doesn't exist by referring to the register file by a register allocating section, the load processing section loads the data of the corresponding register key into the register file from the register saving section.

The register file has physical registers of the number which can be designated by the register designation field of the instruction register. Each of the physical registers of the register file turns on a valid flag by the allocation of the renaming register and expresses a using state. Each of the physical registers turns off the valid flag by the saving of the register data and shows a vacant state. The register saving section has a valid flag field in addition to the data field to store the saving data. The valid flag is turned on by the saving of the register data and expresses the data saving state. The valid flag is turned off by the loading of the saving data and shows that the data exists in the register file. When an overflow occurs in the register file, the save processing section saves the data of all of the physical registers having the context ID of either one of the contexts other than the context that is being executed into the register saving section of the corresponding context. Prior to loading the register data of the context which is being executed to the register file from the register saving section, the load processing section allows a save processing section to save the data of the physical register having the context ID of either one of the contexts other than the context which is being executed into the register saving section of the corresponding context. The saving and loading operations of the register data can be also executed on a register unit basis instead of the context unit basis. A plurality of contexts as targets to be executed are a plurality of processes which are executed in different address spaces or may be a plurality of threads which are executed in the same address space. The thread is a loop of a numerical value calculating program.

The invention provides a multi-context processing method to support a multi-context. This processing method has:

a forming step of forming a plurality of contexts as execution units to execute a certain group of works of a certain meaning;

an instruction executing step of supplying an instruction of the context existing in a pipeline, executing such an instruction, and when a vacancy of the pipeline is judged, switching the context to another context which is being executed, and simultaneously executing a plurality of contexts;

an ID setting step of setting a peculiar context ID to each of the plurality of contexts which are being simultaneously executed; and a register renaming step of renaming a name of the register which is used in the execution of the context to a register name in which a designation register name of an execution instruction was added to the context ID and allocating a physical register.

The details of the above processing method are also fundamentally the same as the construction of the apparatus.

According to the processor for supporting the multi-context and its processing method of the invention as mentioned above, a dependency relation between the instructions by the multi-register renaming function is solved, a mishit of the cache due to the execution of the load instruction, the execution of a branch instruction, or the like is judged, and the context to be supplied to the pipeline is switched, thereby reducing the stall of the pipeline and improving the performance of the processor. By scheduling the simultaneous execution of the flexible context, the potential capacities of the processor having an architecture of the super scalar can be most effectively brought out. In the multi-register renaming, the number of registers which are used by a plurality of contexts to be simultaneously executed can be set to the same number in the case where the single context was executed, and a using efficiency of the resources is not reduced. Further, in case of switching the context, the physical registers used in the context before switching are gradually switched every necessary registers at a time without instantaneously switching to the registers to be used in the context after the switching, thereby reducing the overhead upon switching of the contexts. Not only the context of a small size such as a DO loop but also the context of a large size such as a user process can be also handled.

The above and other objects, features, and advantages of the present invention will become more apparent from the following detailed description with reference to the drawings.

DETAILED DESCRIPTION OF THE PREFERRED EMBODIMENT

[Operation environment]

Figure 2:
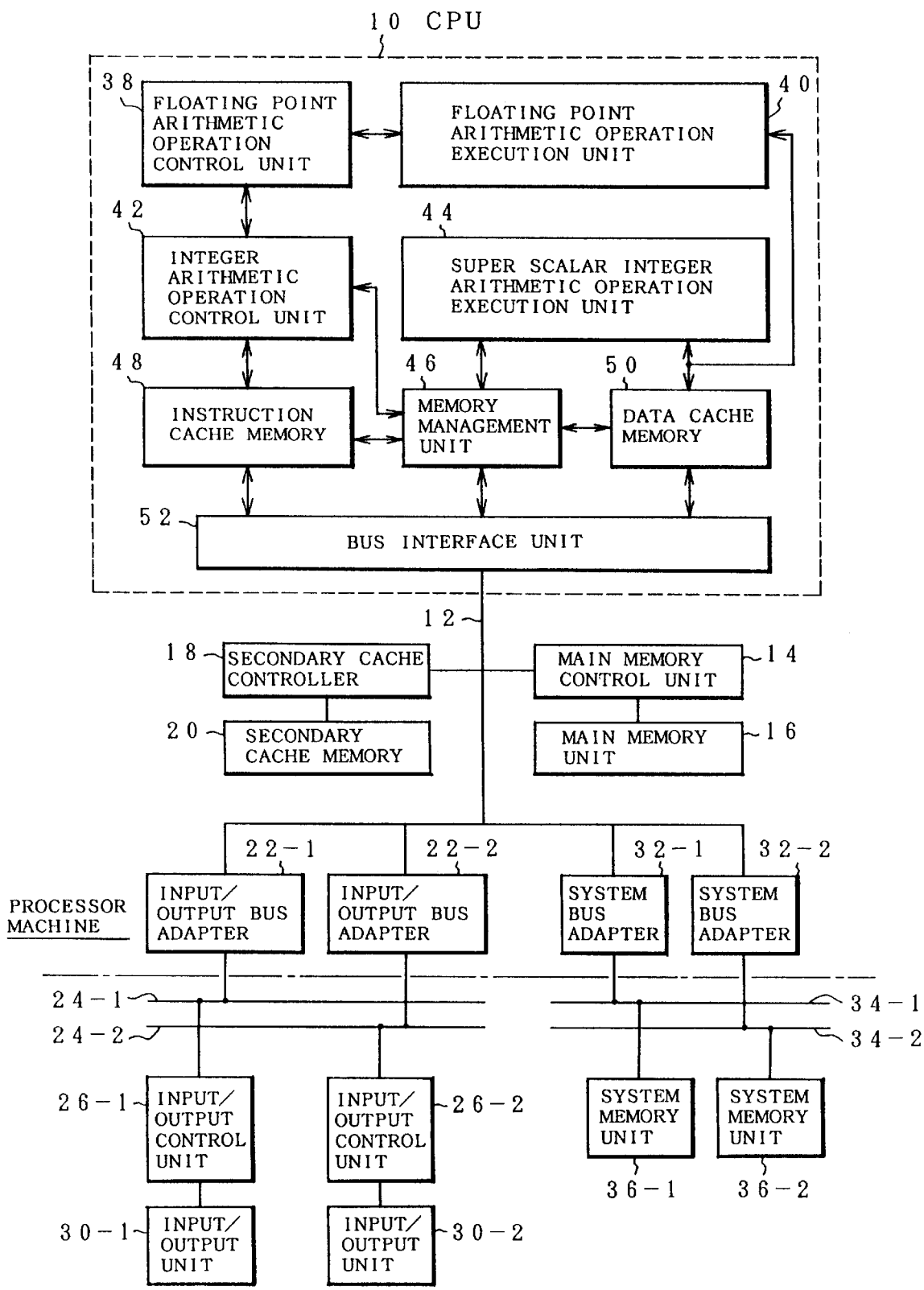
FIG. 2 is a block diagram of a hardware serving as an operation environment of the present invention.

FIG. 2 shows a hardware of a processor machine serving as an operation environment of a processor to support a multi-context of the present invention. In the processor machine, a main memory unit 16 is connected to a bus 12 from a CPU 10 through a main memory control unit 14. External input/output (I/O) buses 24-1 and 24-2 are connected to input/output bus adapters 22-1 and 22-2. Internal input/output buses 30-1 and 30-2 are connected to the input/output buses 24-1 and 24-2 through input/output control units 26-1 and 26-2. As I/O units 30-1 and 30-2, magnetic disk units, optical disk units, magnetic tape units, etc. are used. The I/O units 30-1 and 30-2 are connected to external system buses 34-1 and 34-2 via system bus adapters 32-1 and 32-2. System memory units 36-1 and 36-2 are connected to the system buses 34-1 and 34-2. Further, by connecting a plurality of same processor machines as the processor machines (shown in the diagram) to the system buses 34-1 and 34-2, a multi-processor system is constructed. The CPU 10 of the processor machine has: a floating point arithmetic operation control unit 38; a floating point arithmetic operation execution unit 40; an integer arithmetic operation control unit 42; a super scalar integer arithmetic operation execution unit 44; a memory management unit 46; an instruction cache memory 48; a data cache memory 50; and a bus interface unit 52. The floating point arithmetic operation execution unit 40 executes a floating point arithmetic operation under control of the floating point arithmetic operation control unit 38. The super scalar integer arithmetic operation execution unit 44 has a pipeline and discriminates integer arithmetic operating instructions which can be dynamically executed in parallel under control of the integer arithmetic operation control unit 42 and executes integer arithmetic operations in parallel. Namely, in the invention, processes such that a plurality of contexts are executed in parallel by the integer arithmetic operation control unit 42 and super scalar integer arithmetic operation execution unit 44 are executed. The instruction cache memory 48 is subjected to a cache control by the memory management unit 46. Program codes fetched from the main memory control unit 16 which are used by the floating point arithmetic operation control unit 38 and integer arithmetic operation control unit 42 are stored in the instruction cache memory 48. Among them, with respect to the processes of the multi-context of the invention which are supported by the integer arithmetic operation control unit 42 and super scalar integer arithmetic operation execution unit 44, an instruction train of a plurality of multi-contexts of which the execution was started is stored in the instruction cache memory 48. The data cache memory 50 stores the data read out from the main memory control unit 16 which is used in the arithmetic operations of the floating point arithmetic operation execution unit 40 and super scalar integer arithmetic operation execution unit 44. A cache control of the data cache memory 50 is also executed by the memory management unit 46.

[Switching of contexts]

Figure 1:
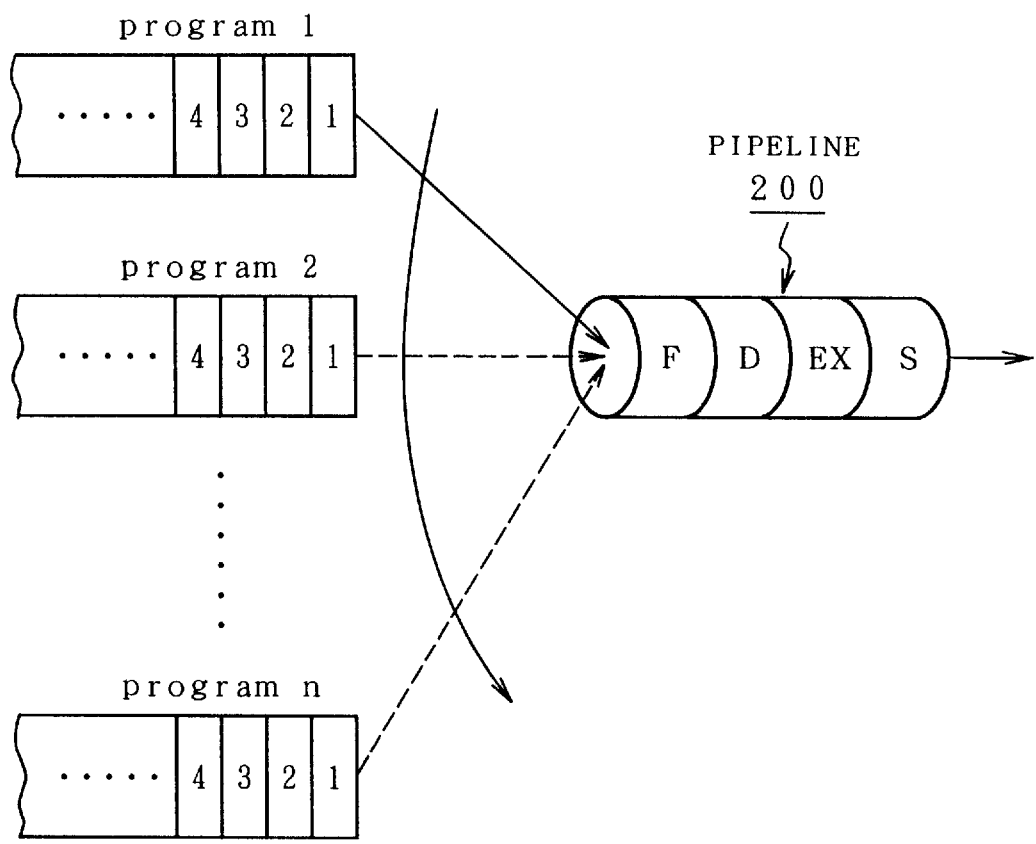
FIG. 1 is an explanatory diagram for a conventional context switching.

According to a fundamental architecture for a context switching in the processor to support the multi-context of the invention, when the instruction having a possibility such that a stall occurs in the pipeline is executed, the context is switched without mechanically switching the context as in the conventional apparatus of FIG. 1. In the case where one context can be continuously executed, this context is continuously executed as possible. With this method, an unnecessary overhead in association with the switching of the contexts is reduced, thereby avoiding a decrease in hit ratio of the cache. Specifically speaking, the time when the load instruction or branch instruction is executed in the context that is at present being executed is set to a switching timing of the context. When a mishit occurs as a result of that the cache memory is accessed by the execution of the load instruction, a latency of tens of cycles exists until the data as a target to be accessed reaches from the main memory unit. In the case where the branch condition is satisfied and the branch is executed (taken) as a result of the execution of the branch instruction, there is a possibility such that a stall occurs in the pipeline to fetch the instruction on the branch destination side. In the invention, therefore, the time when the load instruction or branch instruction is executed in the context that is being executed is set to a timing for switching to another context that is at present being executed. As a method of realizing the context switching according to the invention, there are two kinds of methods such as method for switching by only a hardware and method for switching by both of a compiler and a hardware.

The case of switching the context by only the hardware will now be described. When a mishit of the cache memory in the execution of the load instruction is detected by only the hardware, a signal indicative of the coincidence/dissidence of a cache tag is inputted to the CPU side and can be used. An output of a branch target buffer can be used to judge whether the branch condition is satisfied or not satisfied (taken/not taken) in association with the execution of the branch instruction. Such a detection of the cache mishit in association with the execution of the load instruction and a detection of the satisfaction of the branch condition (taken) by the execution of the branch instruction are generally realized as functions of the integer arithmetic operation control unit 42 and super scalar integer arithmetic operation execution unit 44 having an architecture of the super scalar provided for the CPU 10 in FIG. 2 and can correspond by a small change in process such as allocation of a register to assure the detection results or the like. As an order of the contexts which are realized by only the hardware, it is sufficient to switch the contexts in accordance with the order predetermined by a round robin system with respect to a plurality of contexts as targets to be executed at present.

Figure 3:
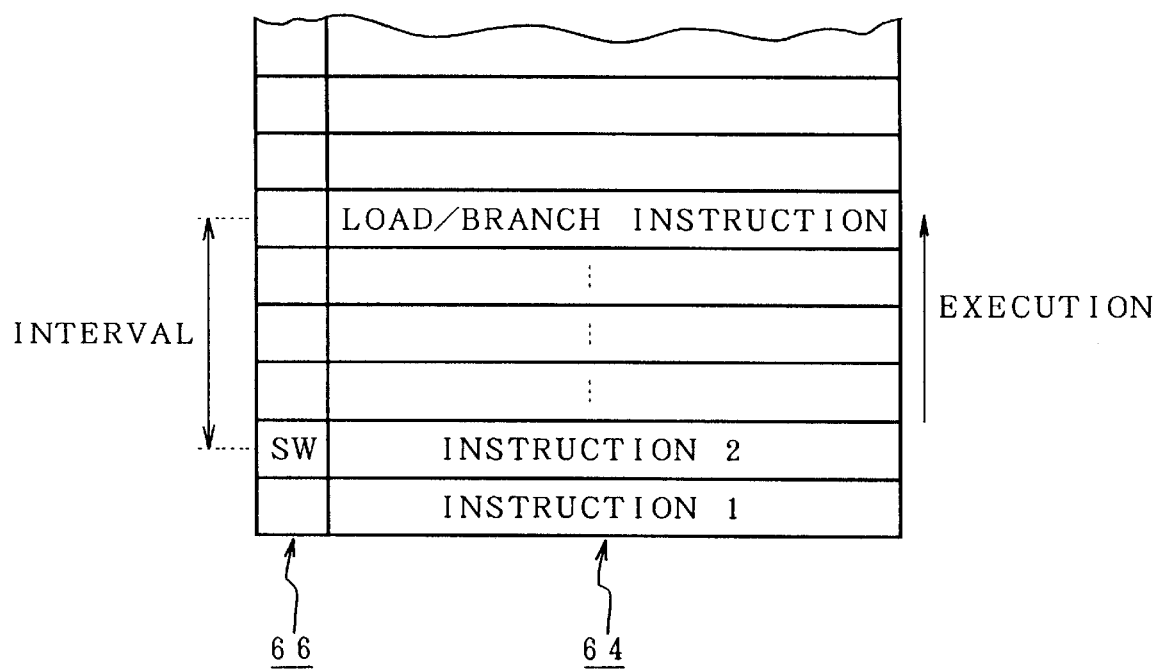
FIG. 3 is a block diagram of a context switching function.

The context switching of the invention which is realized by both of the software and the hardware by the compiler will now be described. FIG. 3 shows an instruction code of a certain context which is at present being executed in case of performing the context switching by both of the software and the hardware. In this context, the instructions are sequentially supplied to the pipeline in accordance with the order of instruction 1, instruction 2, . . . and are executed. The load/branch instruction indicates that the load instruction or branch instruction exists here. The program code has a feature such that it has an attribute information field 66 in addition to an instruction field 64 to store an ordinary instruction train. Attribute information is stored in the attribute information field 66. The attribute information field 66 is defined as a field to store various attribute information to assist the high-speed execution of the program code although the meaning of the program code is not changed. The attribute information field 66 corresponds to "directive" in the compiler. In the program code of the context, attribute information "SW" is provided for the attribute information field 66 of the instruction 2. The attribute information "SW" indicates the contents such that "Start instruction fetch of another context simultaneously with the execution of the instruction 2". After that, in the portion of the load/branch instruction, in the case where the mishit of the cache occurs by the execution of the load instruction or the branch is executed by the satisfaction of the branch condition, the stall occurs in the pipeline. Therefore, the processing routine immediately advances to the execution of the instruction train of another context which has already been fetched by the instruction of the attribute information "SW". Thus, in response to the mishit of the cache by the execution of the load instruction or the execution of the branch instruction, the context can be switched from the context which is being executed to another context in the way of the execution without an overhead. The attribute information "SW" for the attribute information field 66 of the program code can be embedded by analyzing the program code after compiling. For this work, it is sufficient to search an operation code of the load instruction or branch instruction in the program code after completion of the compilation and to put the attribute information "SW" into the attribute information field 66 of the instruction field that is precedent to the load instruction or branch instruction by only an interval of a predetermined number of cycles which are necessary to fetch.

Figure 4:
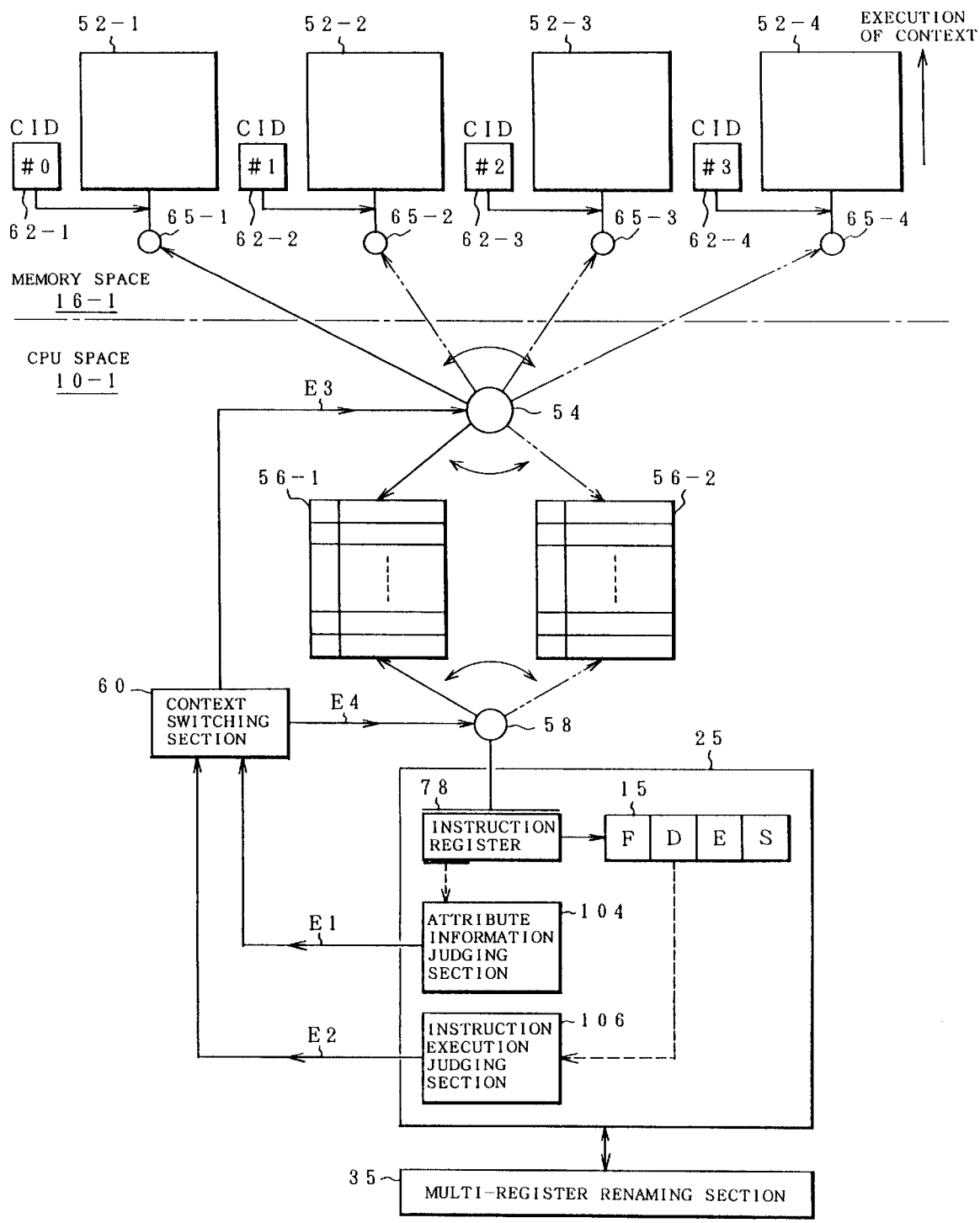
FIG. 4 is an explanatory diagram of a structure of an instruction stream constructing a context.

FIG. 4 is a functional block of the invention to realize the switching of a plurality of contexts using the program code having the structure of FIG. 3. This functional block is realized by the integer arithmetic operation control unit 42 and super scalar integer arithmetic operation execution unit 44 provided for the CPU 10 in FIG. 2. First, it is divided to a memory space 16-1 and a CPU space 10-1. The memory space 16-1 is realized by the instruction cache memory 48 in FIG. 2. If no instruction exists in the cache, instructions exist in the external main memory unit 16. The CPU space 10 is a space which is realized by the integer arithmetic operation control unit 42 and super scalar integer arithmetic operation execution unit 44. In the embodiment, four contexts 52-1 to 52-4 are provided in the memory space 16-1. Each of the contexts 52-1 to 52-4 is an instruction stream of the program code compiled as shown in FIG. 3. ID mapping registers 62-1 to 62-4 to set, for example, #0 to #3 as context IDs are provided for the contexts 52-1 to 52-4, respectively. The instruction streams of the contexts 52-1 to 52-4 are read out by context reading sections 65-1 to 65-4, respectively. When reading out the instruction streams of the contexts 52-1 to 52-4, the context reading sections 65-1 to 65-4 add the context IDs #0 to #3 set by the ID mapping registers 62-1 to 62-4 to those instruction streams and read out them. A first router 54, instruction buffers 56-1 and 56-2, a second router 58, an instruction executing section 25, a multi-register renaming section 35, and a context switching section 60 are provided for the CPU space 10-1. The first router 54 selects either one of the contexts 52-1 to 52-4 and stores the instruction stream read out from the selected context into one of the instruction buffers 56-1 and 56-2. Into which one of the instruction buffers 56-1 and 56-2 the instruction stream from the router 54 is stored is controlled by the context switching section 60 by an instruction stream switching signal E3. The second router 58 takes out the instruction from either one of the instruction buffers 56-1 and 56-2 and allows the instruction executing section 25 to execute it. The instruction fetch from either one of the instruction buffers 56-1 and 56-2 by the second router 58 is also controlled by an instruction stream switching signal E4 from the context switching section 60. An instruction register 78 is provided for the instruction executing section 25 and stores an instruction code taken out from the instruction buffer 56-1 or 56-2 by the second router 58 and supplies to a pipeline 15. The pipeline 15 is constructed by four stages and has the fetching stage (F), decoding stage (D), executing stage (EX), and storing stage (S). Further, an attribute information judging section 104 and an instruction execution judging section 106 are provided for the instruction executing section 25. The attribute information judging section 104 judges the attribute information of the attribute field 66 in FIG. 3 with respect to the instruction inputted to the instruction register 78. When the attribute information "SW" is judged, the attribute information judging section 104 generates an SW information detection signal El to the context switching section 60. When receiving the SW information detection signal El from the attribute information judging section 104, the context switching section 60 executes the switching operation of the first router 54 to store the instruction stream from another context serving as a switching destination side into either one of the instruction buffers 56-1 and 56-2 in the vacant state. When the mishit of the cache memory by the execution of the load instruction after the attribute information judging section 104 judged the attribute information "SW" or the satisfaction of the branch condition (taken) by the execution of the branch instruction is detected, the instruction execution judging section 106 generates an execution detection signal E2 of the load instruction or branch instruction to the context switching section 60. When receiving the detection signal E2, the context switching section 60 outputs the instruction stream switching signal E4 to the second router 58. When the attribute information "SW" is judged, the context switching section 60 switches to the instruction buffer 56-1 or 56-2 on the side where it fetched the instruction from another context serving as a switching destination side due to the switching of the first router 54, thereby preventing that a stall occurs in the pipeline 15. The first router 54 switches a prefetch route to previously store the instruction stream from the contexts 52-1 to 52-4 into either one of the instruction buffers 56-1 and 56-2. On the other hand, it can be regarded that the second router 58 has a function to switch the fetch route of the instruction from either one of the instruction buffers 56-1 and 56-2 to the instruction register 78 of the instruction executing section 25. Further, the multi-register renaming section 35 is provided for the instruction executing section 25. The details of the multi-register renaming section 35 will be obviously explained hereinlater.

Figure 5:
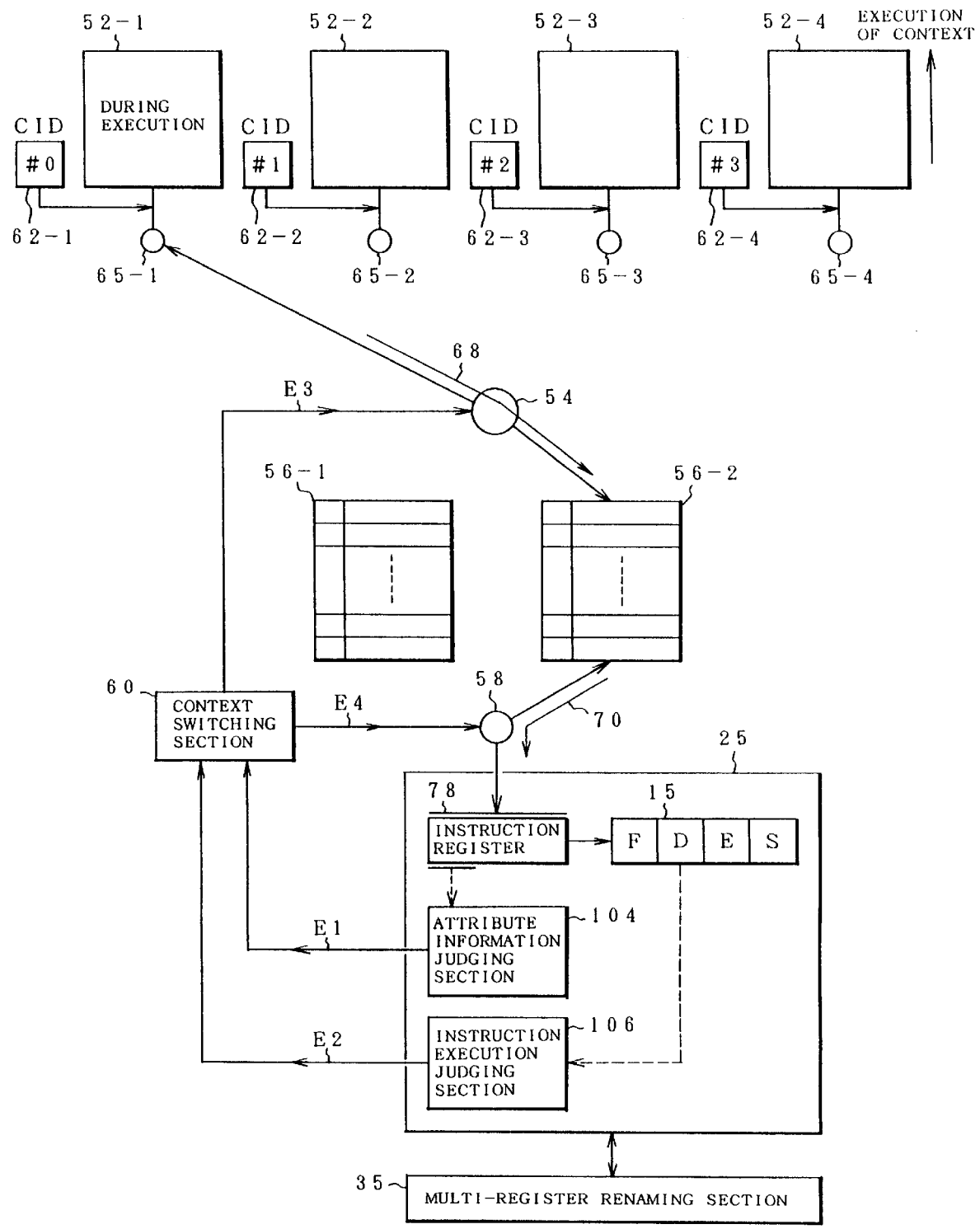
FIG. 5 is an explanatory diagram of an instruction route when a context of CID0 is executed.
Figure 6:
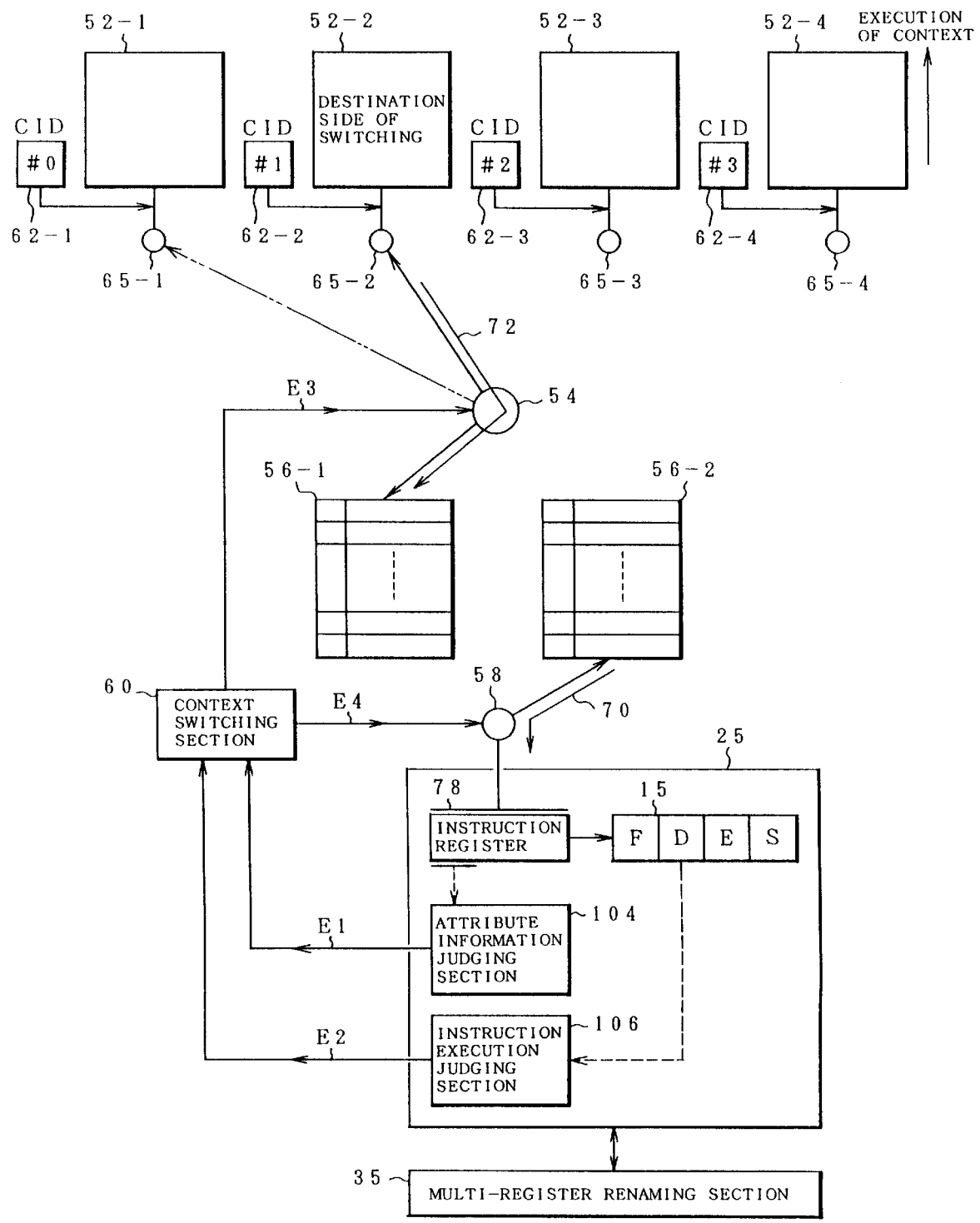
FIG. 6 is an explanatory diagram for route switching in the case where a context switching request is generated from attribute information.

The context switching operation in FIG. 4 will now be specifically explained. It is now assumed that the context 52-1 is being executed as shown in FIG. 5. In this case, the first router 54 selects the context reading section 65-1. The instruction stream in which the context ID #0 by the ID mapping register 62-1 was added to the instruction stream of the context 52-1 is supplied to, for example, the instruction buffer 56-2 by an instruction route 68. The second router 58 selects the instruction buffer 56-2 to which the instruction stream from the context 52-1 was supplied. The program code of the context 52-1 is taken out from the instruction buffer 56-2 and is inputted to the instruction register 78 and is executed by the pipeline 15. During the execution of the context 52-1, when the attribute information "SW" in FIG. 3 appears in the attribute information field 66, the attribute information judging section 104 of the instruction executing section 25 judges the attribute information "SW" and outputs the SW information detection signal El to the context switching section 60. When receiving the SW information detection signal El, the context switching section 60 generates the instruction stream switching signal E3 to the first router 54 as shown in FIG. 6, switches to the context reading section 65-2 of another context 52-2 serving as a switching destination side, and simultaneously switches to the instruction buffer 56-1. Therefore, the instruction stream by an instruction route 72 of the context 52-2 which is stopped at present although it is a target for execution is prefetched to the instruction buffer 56-1. In this instance, the second router 58 is not switched but the instructions stored in the instruction buffer 56-2 of the context 52-1 that is at present being executed are sequentially taken out by an instruction route 70 and are executed by the instruction executing section 25. In the switching state of FIG. 6, when the instruction executing section 25 executes the load instruction during the execution of the instruction stream of the context 52-1 remaining in the instruction buffer 56-2, the execution of the load instruction is judged by the instruction execution judging section 106. Under a condition such that the mishit occurred in the data cache memory, the load instruction execution detection signal E2 is outputted to the context switching section 60. When receiving the load instruction execution detection signal E2, the context switching section 60 generates the instruction route switching signal E4 to the second router 58 and immediately switches the instruction route to the instruction buffer 56-1. In the next cycle after the load instruction was executed, consequently, the instruction code of the context 52-2 is inputted to the pipeline 15. Even if the cache mishit occurred by the execution of the load instruction of the context 52-1, it is possible to switch to the execution of another context 52-2 without an overhead without causing a stall in the pipeline 15. In the embodiment of FIG. 4, although the number of contexts which can be simultaneously executed has been set to 4, such a number is not limited to 4 but is actually determined on the basis of a bit length which is used in the context ID and the number of contexts which are efficient to simultaneously execute. It is effective that the switching of the contexts is simply executed by the round robin. Namely, the contexts are cyclically switched in accordance with the order of contexts #0, #1, #2, and #3.

Figure 7:
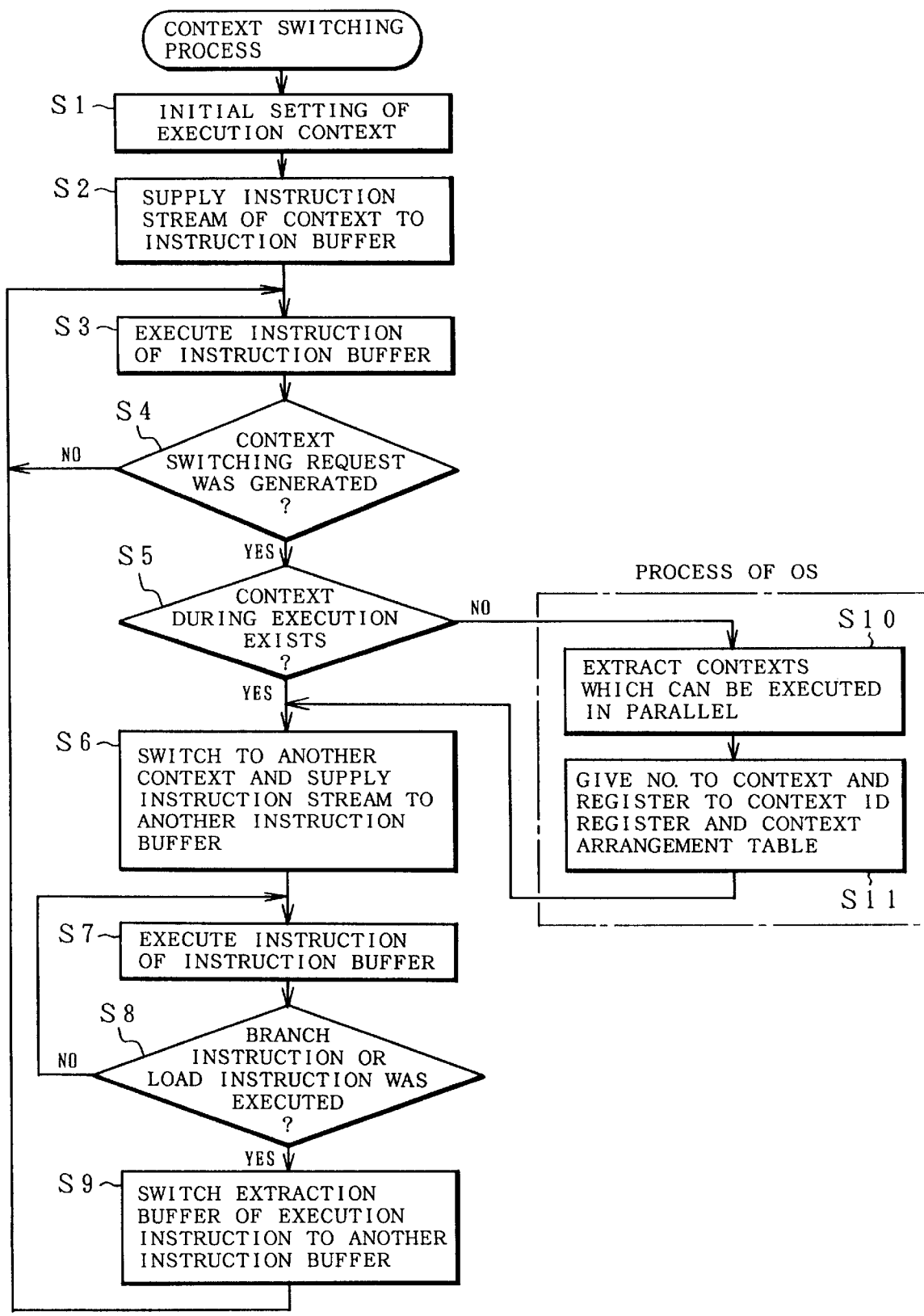
FIG. 7 is a flowchart for a context switching process of the invention.

A flowchart of FIG. 7 relates to the context switching process in the functional block of FIG. 4. First in step S1, the initial setting of the context as a target for execution is performed. Since such an initial setting is impossible in the instruction processing system of the CPU 10, an OS is called out and is subjected to an initial setting for allocating the context as an execution target. In step S2, the instruction stream of the context as an execution target is supplied to the instruction buffer. In step S3, the instruction of the instruction buffer is taken out and is inputted to the pipeline, thereby executing. During the execution of the instruction of the context, a check is made in step S4 to see if a context switching request occurs or not from the attribute information of the instruction. That is, a check is made to see if the attribute information "SW" has been judged or not. When the attribute information "SW" is judged, it is determined that the context switching request was generated. In step S5, a check is made to see if the context which is at present being executed exists or not. When there is the context during the execution, the reading operation of the instruction stream is switched to another context in the way of the execution in step S6 and the instruction stream is supplied to another instruction buffer. In step S7, the instruction of the context which is at present being executed and remains in the instruction buffer before switching is executed. In step S8, a check is made to see if the branch instruction or load instruction has been executed or not. When the execution of the branch instruction or load instruction is judged in step S8, the instruction buffer from which the execution instruction is taken out is switched to the instruction buffer in which the context was switched to another context in step S6 and the instruction stream has been stored in step S9. Thus, the context switching is satisfied. After completion of the context switching, the processing routine is returned to step S3 and the execution of the instruction for the instruction stream after the switching as a target is repeated. In a manner similar to the above, each time the context switching request is generated, the switching process is executed. On the other hand, when the context switching request is generated in step S4, if the context in the way of the execution doesn't exist in step S5, step S10 follows. The contexts which can be executed in parallel are taken out. In step S11, the numbers are given to the contexts taken out and are registered into the context ID register and context arrangement table. Since the processes in steps S10 and S11 cannot be processed by the instruction executing system of the context, the OS is called out and is subjected to the allocation of new contexts and the allocation of the context numbers. Although the processes in steps S10 and S11 which are assisted by the OS are processes such that an overhead relatively increases, since they are not frequently caused, their influences can be said to be small.

[Multi-register renaming]

Figure 8:
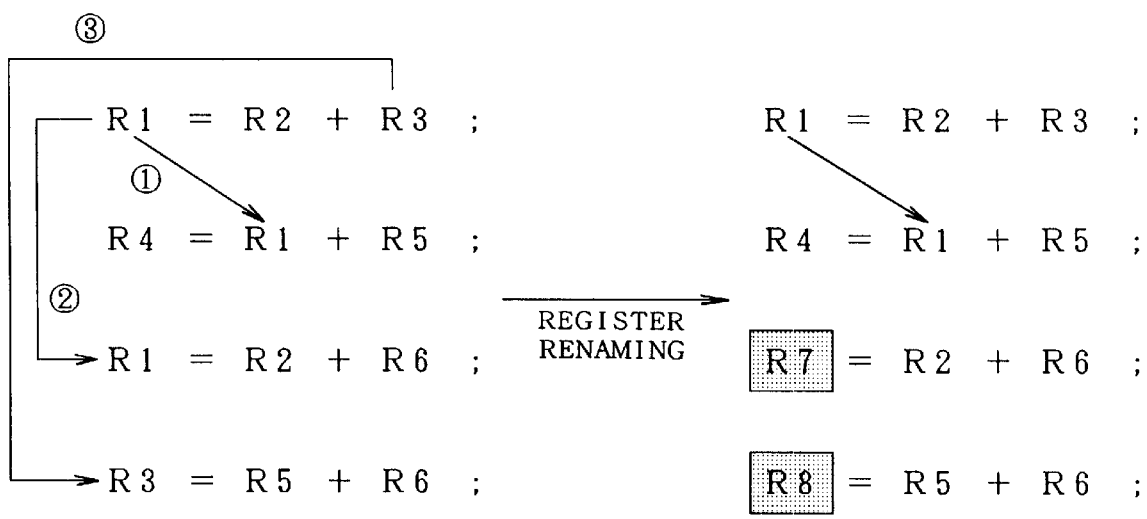
FIG. 8 is a block diagram of a multi-register renaming function of the invention.

Many super scalar processors which are at present used use an algorithm called a register renaming to dynamically eliminate the dependency between the instructions at the time of execution. FIG. 8 shows an outline of the register renaming. When seeing the dependency relation of the program before a change in FIG. 8, the registers R1 of the first and second lines have a true dependency relation (1), the registers R1 of the first and third lines have a relation of an output dependency (2), and the registers (R) of the first and fourth lines have a relation of an opposite dependency (3). In the register renaming state before the change, the registers R1 of the first and second lines have the relation of the output dependency (2) and registers R3 of the first and fourth lines have the relation of the opposite dependency (3). Therefore, the instructions of the first, third, and fourth lines cannot be simultaneously executed. Therefore, as shown in a state after changing, by executing a renaming (a name is rewritten) for changing the register R1 of the third line to a new register R7 and by changing the register R3 of the fourth line to a new register R8, the output dependency (2) and the opposite dependency (3) can be solved. Therefore, the instructions of the first, third, and fourth lines can be simultaneously executed by the register renaming after completion of the change. As mentioned above, the dependency relation between the instructions in the output dependency and opposite dependency states is eliminated by the register renaming and those instructions can be simultaneously executed. It is needless to say that a true dependency cannot be eliminated even by the renaming. Although the renaming of FIG. 8 is a method of eliminating the dependency of the instructions in the single instruction stream, according to the invention, such a register renaming method is extended to a target of the instruction dependency about a plurality of instruction streams in which the simultaneous execution of the plurality of contexts is set to a target. Namely, in order to realize the register renaming in a plurality of instruction streams by the execution of a plurality of contexts, the following requirements are determined.

I. To avoid the collision of the registers, when the registers are renamed, the ID of the context is used in addition to the register No. in the instruction.

II. To increase the number of registers which are used by one context, a register file for register renaming is constructed by an associative memory so that it can be retrieved by keys of (register No. in the instruction)+(context ID)

Such a memory is hereinafter, called a renaming buffer. A plurality of physical registers which are realized by the renaming buffer are not used by dividing into equal portions by the number of contexts, but a virtual register allocation is performed to the physical registers.

III. At the time of the context switching, the register of the old context is not saved from the renaming buffer. The register allocated to the old context is saved at the time point when the usable physical registers in the renaming buffer are extinguished irrespective of the switching of the contexts. Namely, the saving of the registers from the renaming buffer is loosely executed.

Such a renaming of the register having the above contents of I to III is called a multi-register renaming. By constructing such a multi-register renaming, a plurality of contexts can be simultaneously supplied to the pipeline. That is, it is now assumed that the register R1 is used by a certain context #0 and that another context #1 which the user considers to execute simultaneously with the context #0 that is being executed also has been using the same register R1. In this case, according to the multi-register renaming of the invention, the register R1 which is used by the two contexts #0 and #1 is renamed to "00-R1" and "10-R1" by adding the context IDs. Therefore, there is no need to change the code and to synchronize by the hardware. A plurality of contexts having the same register name can be simultaneously executed. By saving the information of the renaming register of the contexts which are not being executed into another area of the memory space, the register information of a plurality of contexts can be simultaneously made dependent on the physical registers on the hardware.

Figure 9:
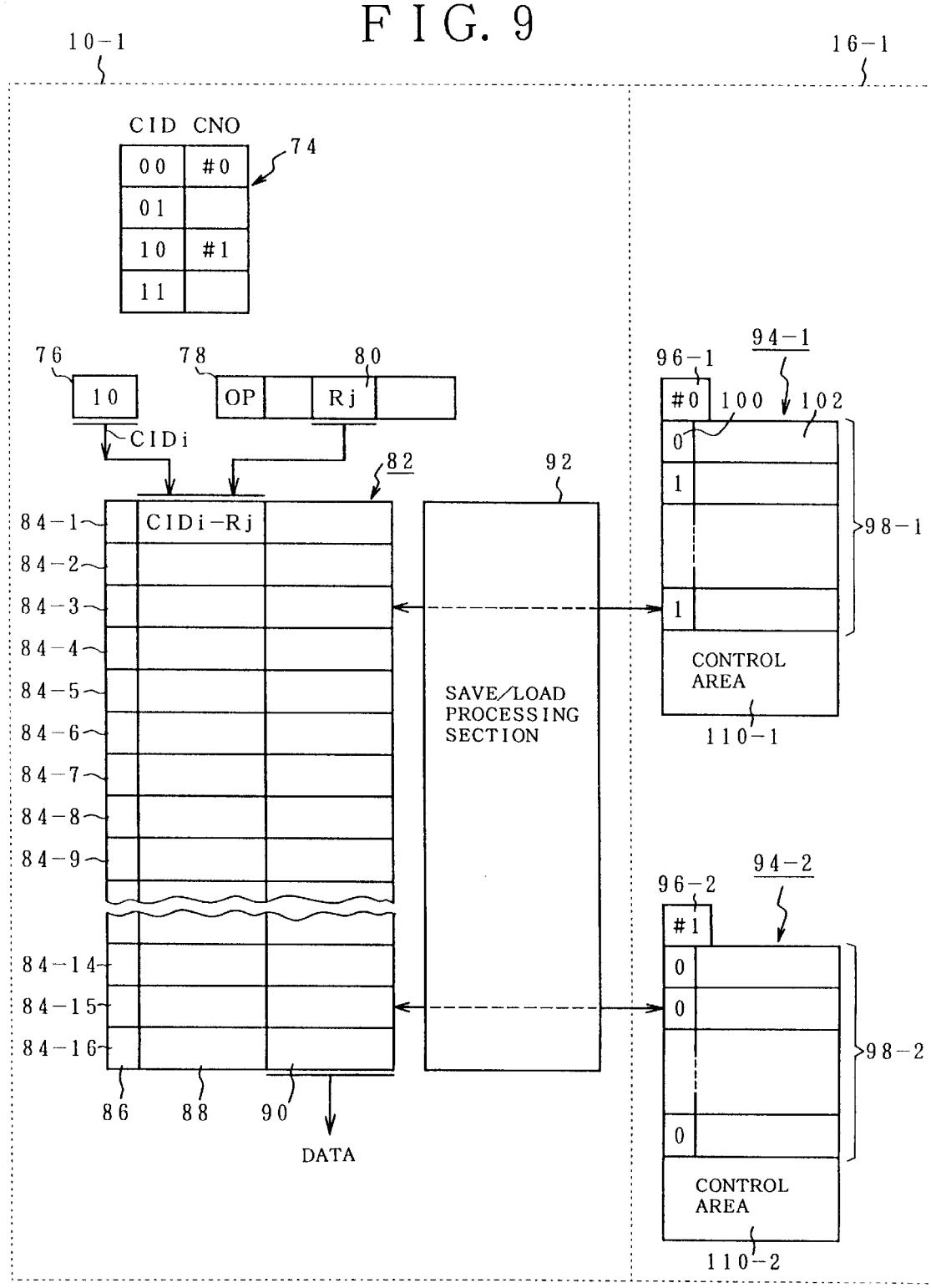
FIG. 9 is an explanatory diagram of an instruction dependency and an elimination of the dependency by a multi-register renaming.

FIG. 9 is a functional block diagram for realizing the multi-register renaming of the invention and shows the details of the multi-register renaming section 35 in FIG. 4. The multi-register renaming section 35 is constructed by using the CPU space 10-1 and memory space 16-1. A context mapping table 62 is provided for the CPU space 10-1. In case of starting the execution of an almost new context, a context number CN is registered into the context mapping table 62 by a support of the OS. Since the embodiment relates to the example in the case where there are four contexts which are simultaneously run, context IDs 00, 01, 10, and 11 are allocated to the context mapping table 62. For this context ID, #0 is registered into the context ID00 as a context number CN0 as an execution target. A context No. #1 is registered into the context ID10. Further, an in-execution context ID register 76, the instruction register 78, a renaming buffer 82, and a save/load processing section 92 are provided for the CPU space 10-1. The context which is at present being executed, for example, the context ID=10 of the context No. #1 is stored in the in-execution context ID register 76. An instruction code in which the register name as a renaming target has been stored in a register designation field 80 is stored in the instruction register 78. The renaming buffer 82 is divided to register areas of physical register sections 84-1 to 84-16 which can be designated by the register designation field 80 of the instruction. In the embodiment, although the number of physical registers which can be designated has been set to 16, it can be set to a proper number such as 32, 64, or the like. Each of the physical register sections 84-1 to 84-16 of the renaming buffer 82 has a valid flag field 86, a key field 88, and a data field 90. In the valid flag field 86, the valid flag is turned on when the physical register is used as a renaming register.

When the physical register is not used, the valid flag is turned off. Therefore, by checking the valid flag 86 of each of the physical register sections 84-1 to 84-16, the presence or absence of the physical registers which can be used for renaming can be judged. A key in which CIDi stored in the in-execution context ID register 76 and the register name Rj of the register designation field 80 of the instruction register 78 are combined is stored in the key field 88 as a key code indicative of the renaming register name. Therefore, even in case of the same register name Rj, the registers can be distinguished by CIDi as a context ID. On the other hand, context control blocks 94-1 and 94-2 are assured in the memory space 16-1 every context numbers #0 and #1 registered in the context mapping table 62. In the context control blocks 94-1 and 94-2, specific areas are allocated to register saving areas 98-1 and 98-2. As register saving areas 98-1 and 98-2, the areas of the same number as that of the physical register sections 84-1 and 84-16 of the renaming buffer 82 are fundamentally assured. Each register area of the register saving area 98-1 is divided to a valid flag field 100 and a register data field 102. When the register data is saved to the register data field 102, a valid flag of the valid flag field 100 is turned on. When the register data is loaded to the renaming buffer 82, the valid flag is turned off. In case of the register saving area 98-1 of the context No. #0, only the head valid flag field 100 is set to 0 and the other valid flags are set to 1. This means that only the head register data exists in the renaming buffer 82. On the other hand, with respect to the register saving area 98-2 of the context No. #1 of the context which is at present being executed, all of the valid flags are equal to 0 and are OFF. This means that all of the renaming registers exist in the renaming buffer 82. The areas of the context control blocks 94-1 and 94-2 other than the register saving areas 98-1 and 98-2 are used as ordinary control areas 110-1 and 110-2. The save/load processing section 92 executes a register saving process for the memory space 16-1 when the renaming buffer 82 overflows and the loading process of the register data from the memory space 16-1 when the renaming register which is used in the context that is being executed doesn't exist in the renaming buffer 82.

Figure 10:
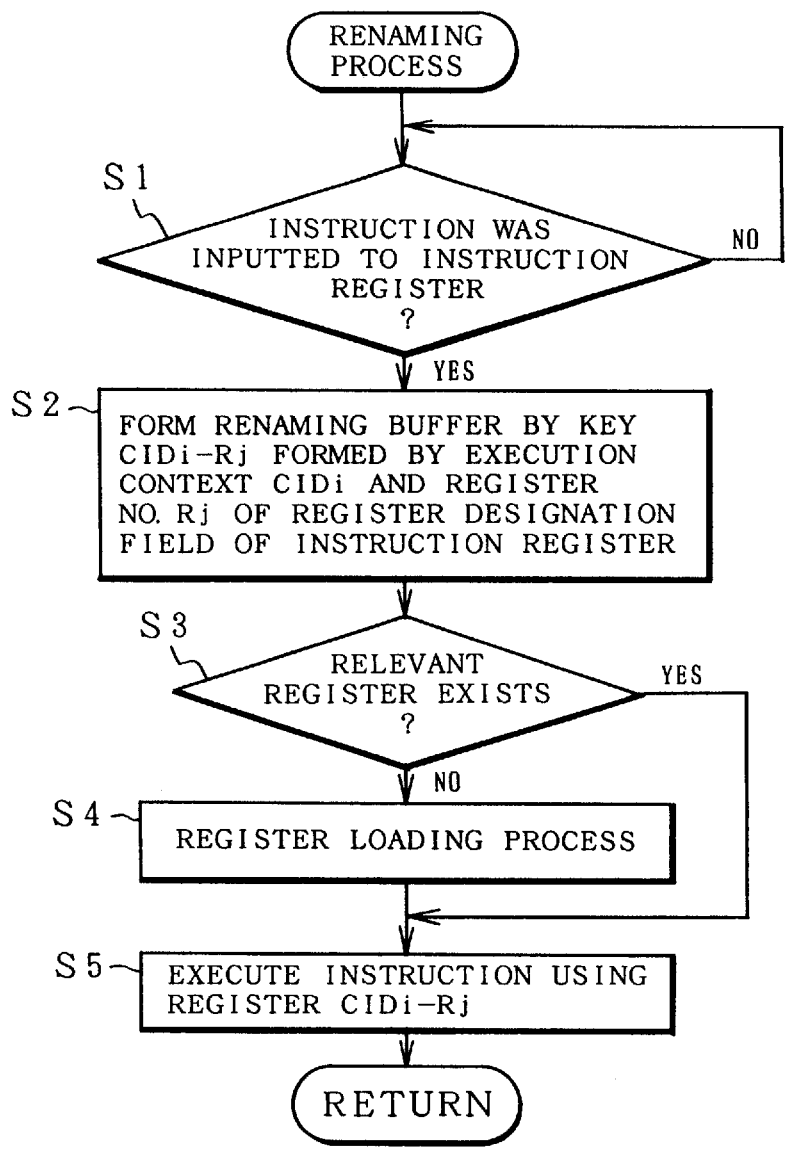
FIG. 10 is a flowchart for a renaming process in FIG. 8.

A flowchart of FIG. 10 relates to the multi-renaming process in FIG. 9. First in step S1, a check is made to see if the instruction as a renaming target has been inputted to the instruction register 78 or not. When the instruction as a renaming target is inputted, in step S2, a key "10-R1" is formed by the context IDi=10 of the context in execution which has been stored in the in-execution context ID register 76 and the register number such as R1 of the register designation field 80 of the instruction register 78 and the key field 88 of the renaming buffer 86 is retrieved. When there is a corresponding register by the retrieval of the key field 88, step S5 follows and the instruction using the renaming register CIDi-Rj=10-R1 is executed. On the other hand, when there is no corresponding register in the renaming buffer 82 in step S3, step S4 follows. The process for loading the corresponding register data from the register saving area 98-2 of the context No. #1 of the memory space 16-1 is executed. The register loading process will be obviously described in detail hereinlater.

Figure 11:
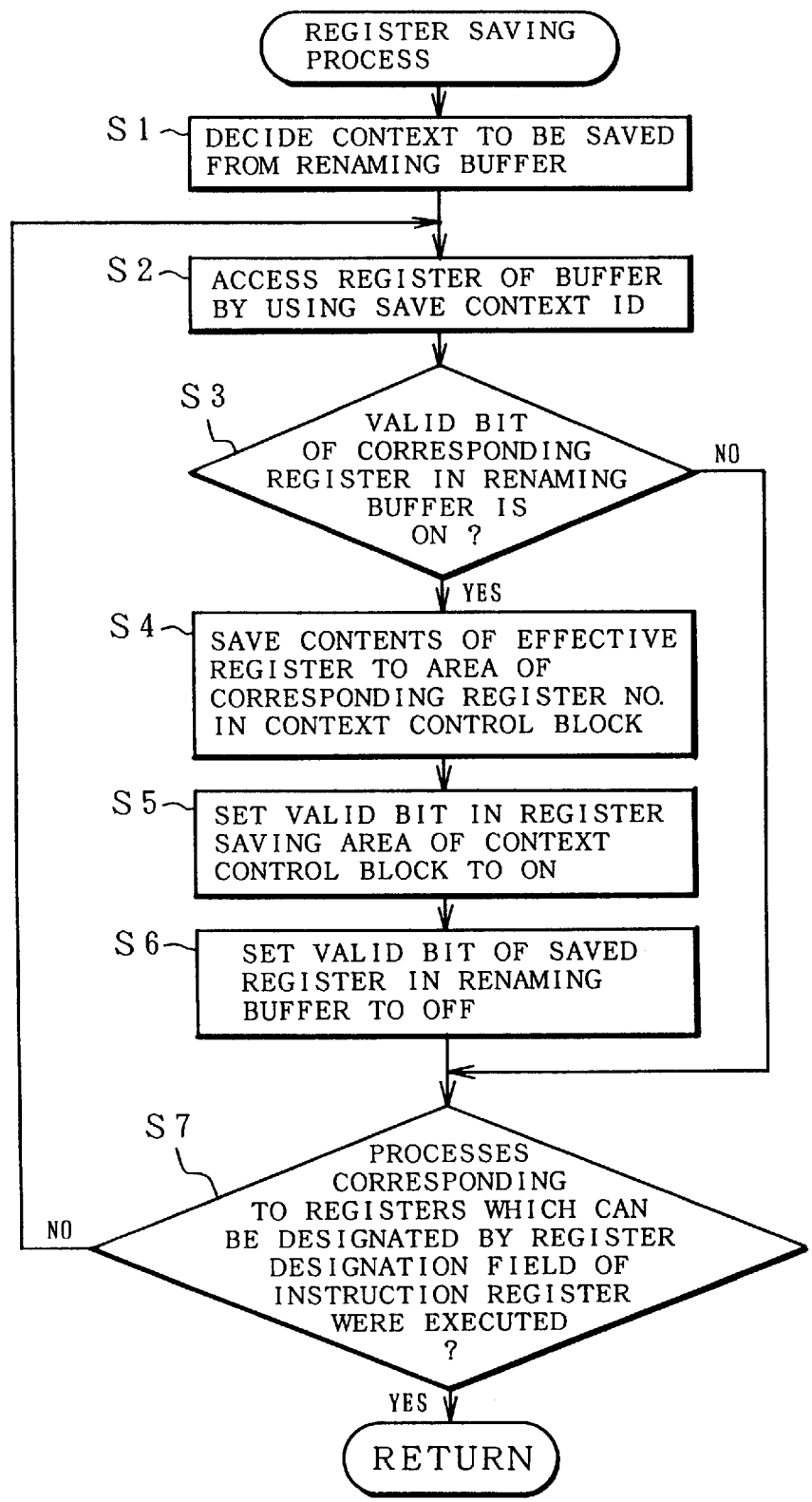
FIG. 11 is a flowchart for a register saving process in FIG. 8.

A flowchart of FIG. 11 relates to the register saving process when the renaming buffer 82 in FIG. 9 overflows. When the renaming buffer 82 overflows during the execution of a certain context, in order to continue the execution of the context, register data existing on the renaming buffer 82 of another context has to be saved to the saving area of the memory space 16-1. The overflow of the renaming buffer 82 in this case occurs in the case where all of the valid flags of the physical register sections 84-1 to 84-16 are ON (bit 1) and the corresponding register doesn't exist by the retrieval of the key field 88 by the key "CIDi-Rj" formed by CIDi of the in-execution context register 76 and the register name Rj of the register designation field 80 of the instruction register 78. In the register saving process in association with the occurrence of the overflow of the renaming buffer 82, first in step S1, the context to be saved from the renaming buffer 82 is determined. It is sufficient to decide the context to be saved by adding a function of an LRU algorithm to the context mapping table 62. Namely, the context of which the time point of the execution is oldest among a plurality of contexts is determined as a context to be saved. Subsequently in step S2, the key field of each of the physical registers 84-1 to 84-16 in the renaming buffer 82 is retrieved by using the ID of the context to be saved, thereby accessing the corresponding register. After that, a check is made to see if the valid flag of the accessed physical register is ON or not. When the valid flag is ON, step S4 follows. The context is saved to the area of the corresponding register number in the context control block of the memory space 16-1 which was labeled with the number of the saving context. After completion of the saving, the valid flag of the register saving area is turned on in step S5. In step S6, the valid flag of the saved register in the renaming buffer 82 is turned off. In step S7, a check is made to see if the processes of, for example, sixteen registers which can be designated by the register designation field 80 of the instruction register 78 have been performed or not. The processes in steps S2 to S6 are repeated until the processes of all of the registers are finished. In step S3, when the valid flag is OFF even when the register having the saving context ID is retrieved, the processes in steps S4 to S6 are unnecessary. By such a register saving process at the time of the overflow, the contents of the register used in the context of the oldest execution time point among the contexts remaining in the renaming buffer 82 are saved into the corresponding register saving area of the memory space 16-1. A vacant register can be assured in the renaming buffer 82 for renaming the context which is being executed.

Figure 12:
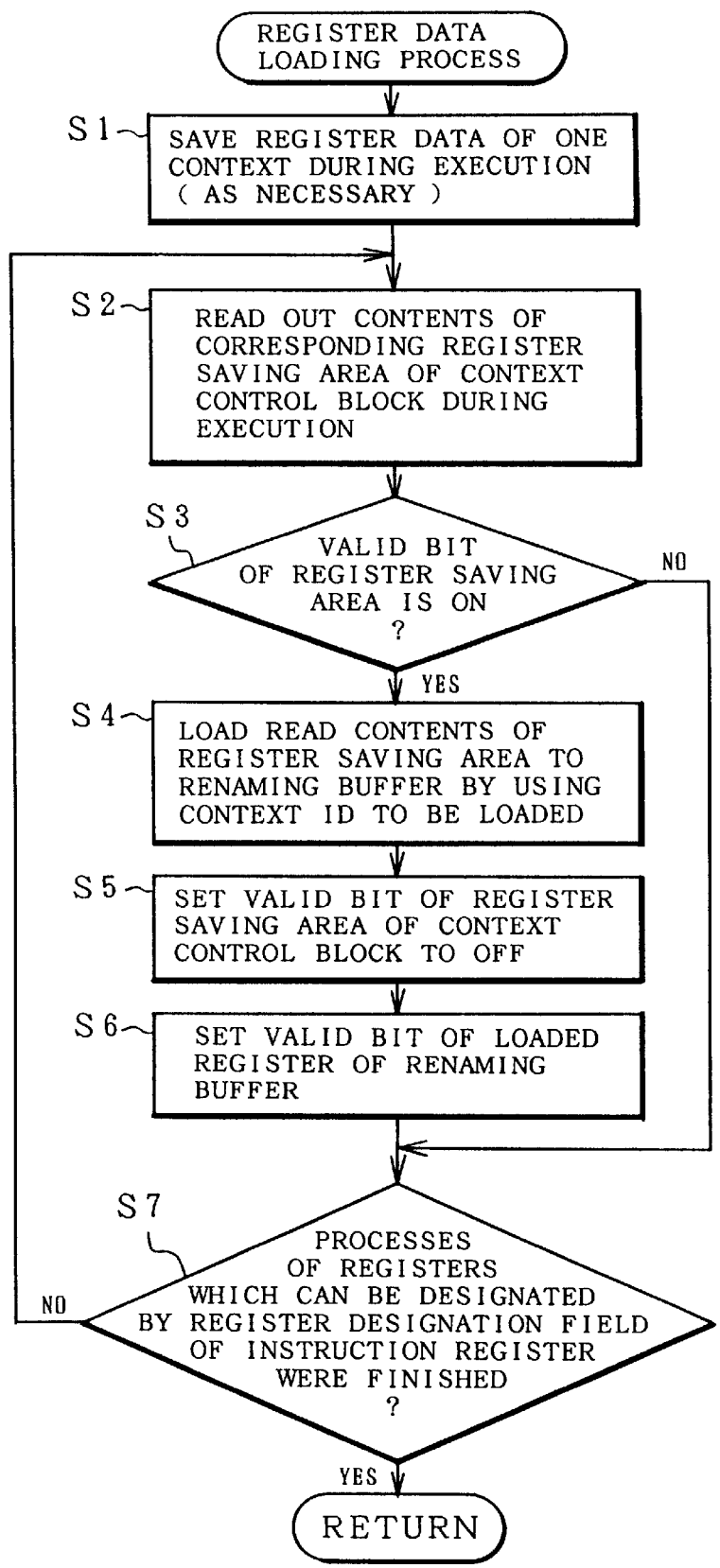
FIG. 12 is a flowchart for a register data loading process in FIG. 8.

A flowchart of FIG. 12 relates to a register loading process by the save/load processing section 92 in FIG. 9. If the register of the context in the way of the execution is saved to the context control block of the memory space 16-1 by the register saving process of FIG. 11, when the execution of such a context is scheduled after that, there is a case where the data of the register doesn't exist on the renaming buffer 82. In such a case, the register data loading process of FIG. 12 is executed. First in step S1, prior to the loading process of the register data, the register data of the registers of another context stored in the renaming buffer 82 at present is saved. This is because when loading new register data, it is guaranteed that an overflow doesn't occur. As a saving process of the register data, the register saving process of FIG. 11 is executed. When enough vacant registers exist from the valid flag of the renaming buffer 82 prior to the register loading process, there is no need to execute the saving process of the register data of another context in step S1. In step S2, the contents of the corresponding register saving area of the context control block of the memory space 16-1 regarding the context during the execution are read out. In step S3, a check is made to see if the valid flag of the register saving area which was read out is ON or not. When it is ON, since this means that the register data exists in the saving area, the readout contents of the register saving area are loaded into the renaming buffer 82 by using the ID of the context to be loaded in step S4. After completion of the register loading, the valid flag of the register area after the loading of the context control block is turned off in step S5. In step S6, the valid flag of the loaded register of the renaming buffer 82 is turned on. In step S3, when the valid flag of the register saving area is OFF, since this means that the register has been assured on the renaming buffer 82, the loading process in steps S4 to S6 is not executed. After one saving data was loaded, a check is made in step S7 to see if the processes of the registers of the saving area which can be designated by the register designation field 80 of the instruction register 78 have been finished or not. The processes in steps S2 to S7 are repeated until the end of the processes. In the above processes of the multi-renaming register, there has been described with respect to the case, as an example, where when the saving or loading operation of the register once occurs, all of the register data belonging to the context as a target is saved or loaded. However, the register data can be also processed one by one. From a viewpoint of the overhead, with respect to the register saving, it is considered to be most efficient that all of the register data included in the context as a saving target is saved and they are loaded one by one as necessary. The replacement of the register data in the renaming buffer 82 is similar to the LRU algorithm in the cache memory. Therefore, as a fundamental replacement algorithm of the register data, the LRU algorithm in the cache memory can be applied. In case of applying the LRU algorithm of the cache memory, however, it is necessary to prepare a few exclusive-use registers for processes for this purpose in addition to the renaming buffer 82.

[Example of application of the Invention]

(I) In case of a small context

A small context relates to, namely, a case of executing a plurality of contexts in the same address space. In such a case, the switching of the context similar to the execution of the conventional multi-thread can be performed. A job to divide to a plurality of contexts in the same address space is fundamentally a work of the compiler. In addition to it, according to the invention, with respect to the switching timing of the contexts, the contexts are switched in response to the execution of the load instruction or branch instruction shown in FIGS. 3 to 7, so that a more flexible context switching can be realized. The multi-register renaming when executing a plurality of contexts in the same address space is as shown in FIGS. 9 to 12. With respect to the hardware, however, the context mapping table 62 provided for the CPU space 10-1 in FIG. 9 and the context control block of every context of the memory space 16-1 can be omitted. With respect to the memory space 16-1, in place of providing the context control block, it is sufficient that the register saving area when the renaming buffer 82 overflows is provided for every context.

(II) In case of a large context

A large context relates to a case of executing a plurality of contexts which don't share the address space. As one of such examples, there is an execution like a process of the UNIX. In case of applying the processor of the invention as a processor element of a parallel computer, a process of a message sent from another processor element, a construction of a message which is outputted from this side to another processor element, and the like are executed in parallel with the execution of the instruction in the processor, so that the overhead for transmission and reception of the messages can be reduced. In the case where the processor of the invention is applied as a processor element of a parallel computer or a distributed computer for mainly performing a communication of the message base, such a function is an extremely effective feature. As a context control block which is used for register saving of the multi-register renaming in such a case, an ordinary processor control block can be used as it is.

(III) Multimedia process

In recent years, what is called a multimedia process which handles a data stream of an image, voice, and the like is highlighted. In the multimedia process, a large amount of data stream has to be processed in a time near a real-time. To process a large amount of data stream in a real-time manner, there is considered an architecture such that a digital signal processor or an exclusive-use processor for executing a certain kind of process is provided as a coprocessor for a main processor. As mentioned above, in the case where the exclusive-use coprocessor is provided for the main processor, the transmission or reception of a control between the main processor and the coprocessor decides an executing speed and also exerts an influence on a response to the user. Particularly, to realize a high response speed to the user, it is very effective to apply the architecture of the processor of the present invention to the parallel processes of the main processor and coprocessor. That is, this is because each time the program to control the coprocessor is executed, a troublesome to save all of the execution environments of the context which is being executed by the main processor or to recover when restarting is unnecessary.

According to the invention as mentioned above, in the case where a plurality of contexts are supplied to the pipeline and are executed, a stall (bubble) of the pipeline is reduced and a whole throughput can be raised. The time which is required for switching of the contexts to avoid the stall of the pipeline can be remarkably reduced. Even when a plurality of contexts are executed, it is sufficient to use only the physical registers of the number necessary for one context. A plurality of contexts can be efficiently executed without increasing the hardware resources. Since the timing to switch the contexts can be designated from the program, the more flexible scheduling of the contexts can be performed. Further, the invention can be applied to contexts of various sizes from what is called threads to processes as contexts. Moreover, a portion which needs an extension when realizing the processor of the invention is a natural extension of the super scalar architecture which is at present used. The architecture according to the invention can be realized without needing a complicated extension in a physical and logical manner.

The invention is not limited by the numerical values used in the above embodiment. The invention can be applied to a processor having a proper architecture so long as it is a super scalar processor.

What is claimed is:

1. A processor for simultaneously supplying a plurality of contexts to a pipeline and executing said contexts, comprising:

a plurality of context storing sections, in each of which is stored one of the plurality of contexts as an execution unit for performing a function of a certain meaning, each of said contexts includes an instruction train having an attribute information field for storing not only a program code but also various information to assist the execution of said program code although a meaning of said program code is not changed, and instruction execution information necessary to execute a subsequent instruction serving as a timing for switching the context corresponding to the instruction train to another context which is being executed is provided in said attribute information field;

an instruction executing section for supplying the instruction train of each of said contexts to the pipeline and executing said instruction train and, when a vacancy of said pipeline is judged, for switching said context corresponding to the instruction train to another context which is being executed and for simultaneously executing said plurality of contexts;

an ID setting section for setting a context ID which is peculiar to each of said plurality of contexts which are simultaneously being executed by said instruction executing section; and a register renaming section for renaming a name of a register which is used when said plurality of contexts are simultaneously executed by said instruction executing section to a register name obtained by adding a designation register name of an execution instruction to a context ID which was set by said ID setting section and whose context is being executed, and for allocating a physical register, wherein said instruction executing section has:

at least two instruction storage buffers;

a first router for switching a prefetch route during an instruction prefetch to prefetch the instruction train for one of said plurality of contexts to one of said instruction storage buffers;

a second router for switching a fetch route during an instruction fetch to fetch the instruction train from one of said instruction storage buffers to said pipeline; and a context switching section which, when the instruction execution information is decoded from the attribute information of the instruction train corresponding to the context which is being supplied to the pipeline, said first router switches said prefetch route from a context on a switching destination side to one of the instruction buffers which is not being used for the instruction fetch, thereby allowing the instruction prefetch to be executed, and subsequently, when the execution of said subsequent instruction serving as the timing for switching to another context is judged, said second router switches said fetch route to the one of the instruction buffers to which the prefetch route was switched by said first router, thereby allowing the instruction of another context which has been prefetched to be fetched to the pipeline.

2. A processor according to claim 1, wherein said subsequent instruction for allowing said context switching is a load instruction, and attribute information to indicate an instruction fetch of another context which is being executed simultaneously with the execution of said instruction is provided for said attribute information field of a precedent instruction code having an interval of a latency which is caused until data reaches from a memory by an execution of said load instruction.

3. A processor according to claim 1, wherein said subsequent instruction for allowing said context switching is a branch instruction, and attribute information to indicate an instruction fetch of another context which is being executed simultaneously with the execution of said instruction is provided for said attribute information field of a precedent instruction code having an interval of a latency which is caused until data reaches from a memory by an execution of said branch instruction.

4. A processor according to claim 1, wherein said instruction executing section recognizes said subsequent instruction serving as a timing for switching to another context which is being executed from a signal of a hardware in association with the execution of said subsequent instruction and switches the contexts.

5. A processor according to claim 4, wherein in the case where said subsequent instruction is a load instruction, said instruction executing section recognizes said context switching from a signal indicative of a mishit of a cache in the execution of said load instruction.

6. A processor according to claim 4, wherein in the case where said subsequent instruction is a branch instruction, said instruction executing section recognizes said context switching from an output of a branch target buffer indicative of a state in which a branch condition is satisfied (taken) in the execution of said branch instruction.

7. A processor according to claim 1, wherein said register renaming section comprises:

an ID register for storing the context ID of the context which is being executed;

an instruction register to fetch the instruction of the context which is being executed;

a renaming register file in which a plurality of physical registers each having a valid flag field, a register key field, and a data field have been mapped on a memory;

a register allocating section for forming a register key obtained by adding a register name of a register designation field of said instruction register to the context ID of said ID register and for allocating a corresponding physical register of said register file as a renaming register;

a register saving section, provided for every context which is being executed, for saving data of said renaming register which overflowed from said register file;

a save processing section for saving the data of said renaming register from said register file to said register saving section; and a load processing section for loading the data of the corresponding register key from said register saving section into said register file in the case where the register corresponding to said register key doesn't exist with reference to said register file by said register allocating section.

8. A processor according to claim 7, wherein said renaming register file has physical registers of the number which can be designated by the register designation field of said instruction register.

9. A processor according to claim 7, wherein said renaming register file shows a using state by turning on said valid flag by allocating the renaming register by said register allocating section and shows a vacant state by turning off the valid flag by saving the register data by said save processing section.

10. A processor according to claim 7, wherein said register saving section has a valid flag field in addition to a data field to store saving data, shows a data saving state by turning on a valid flag by saving the register data by said save processing section, and shows the existence in said renaming register file by turning off said valid flag by loading the saving data by said load processing section.

11. A processor according to claim 7, wherein when an overflow occurs in said renaming register file, said save processing section saves the data of all of said physical registers having the context ID of either one of the other contexts in an execution waiting state to the register saving section of the corresponding context.

12. A processor according to claim 7, wherein prior to loading the register data of the context which is being executed from said register saving section to said renaming register file, said load processing section allows said save processing section to save the data of said physical register having the context ID of either one of the other contexts in the execution waiting state into the register saving section of the corresponding context.

13. A processor according to claim 7, wherein said save processing section and said load processing section execute a saving operation and a loading operation of the register data on a renaming register unit basis.

14. A processor according to claim 1, wherein said plurality of contexts are a plurality of processes which are executed in different address spaces.

15. A processor according to claim 1, wherein said plurality of contexts are a plurality of threads which are executed in the same address space.

16. A processor according to claim 15, wherein said thread is a loop of a numerical value calculating program.

17. A processing method for a processor for simultaneously supplying a plurality of contexts to a pipeline and for executing said contexts, comprising:

a forming step of forming a plurality of contexts as execution units each for performing a function of a certain meaning, each of said contexts includes an instruction train having an attribute information field for storing not only a program code but also various information to assist the execution of said program code although a meaning of said program code is not changed, and instruction execution information necessary to execute a subsequent instruction serving as a timing for switching the context corresponding to the instruction train to another context which is being executed is provided in said attribute information field;

an instruction executing step of supplying the instruction train of each of the contexts to the pipeline and executing said instruction train and, when a vacancy of said pipeline is judged, switching the context corresponding to the instruction train to another context which is being executed and simultaneously executing said plurality of contexts;

an ID setting step of setting a context ID which is peculiar to each of said plurality of contexts which are simultaneously being executed; and a register renaming step of renaming a register name which is used by the execution of said context to a register name obtained by adding a designation register name of an execution instruction to said context ID, thereby allocating a physical register, wherein said instruction executing step further includes the steps of:

after prefetching the instruction train of the context being executed to an instruction buffer, fetching the instruction train to the pipeline and executing the instruction train;

after decoding the instruction execution information from the attribute information of the instruction train of the context being executed, switching a prefetch route to prefetch the context on the switching destination side to an instruction buffer which is not being used for an instruction fetch, and subsequently, after judging the execution of said subsequent instruction serving as a timing for switching to another context, fetching to the pipeline the instruction of another context which was prefetched to the instruction buffer.

18. A method according to claim 17, wherein said subsequent instruction for allowing said context switching is a load instruction, and attribute information to indicate an instruction fetch of another context which is being executed simultaneously with the execution of said instruction is provided for the attribute information field of a precedent instruction code having an interval of a latency which is caused until data reaches from a memory by the execution of said load instruction.

19. A method according to claim 17, wherein said subsequent instruction for allowing said context switching is a branch instruction, and attribute information to indicate an instruction fetch of another context which is being executed simultaneously with the execution of said instruction is provided for the attribute information field of a precedent instruction code having an interval of a latency which is caused until data reaches from a memory by the execution of said branch instruction.

20. A method according to claim 17, wherein in said instruction executing step, a subsequent instruction serving as a timing for switching to another context which is being executed is recognized from a signal of a hardware in association with said subsequent instruction, and the context is switched.

21. A method according to claim 20, wherein in said instruction executing step, in the case where said subsequent instruction is a load instruction, said context switching is recognized from a signal indicative of a mishit of a cache in the execution of said load instruction.

22. A method according to claim 20, wherein in said instruction executing step, in the case where said subsequent instruction is a branch instruction, said context switching is recognized from an output of a branch target buffer indicative of a state in which a branch condition is satisfied (taken) in the execution of said branch instruction.

23. A method according to claim 17, wherein in said renaming step, the context ID of the context which is being executed is stored into an ID register, the instruction of the context which is being executed is fetched to the instruction register;

a register key obtained by adding a register name of a register designation field in the instruction fetched to said instruction register to the context ID of the context which is being executed is formed, a corresponding physical register of a renaming register file having a plurality of physical registers each having a valid flag field, a register key field, and a data field is retrieved by said register key and is allocated as renaming register, when an overflow of said register file occurs, the data of said renaming register is saved to a register saving section provided for every context which is being executed, and in the case where the register corresponding to said register key doesn't exist with reference to said register file, the data of the register key is loaded from said register saving section to said register file.

24. A method according to claim 23, wherein said renaming register file has the physical registers of the number which can be designated by a register designation field of said instruction register.

25. A method according to claim 23, wherein when the renaming registers are allocated to said physical registers, said valid flag is turned on, thereby showing a using state, and said valid flag is turned off by the saving of said register data, thereby showing a vacant state.

26. A method according to claim 23, wherein said register saving section has a valid flag field in addition to a data field to store the saving data, a valid flag is turned on by saving the register data from said renaming register file, thereby showing a data saving state, and said valid flag is turned off by loading the saving data to said renaming register file, thereby showing the existence in said renaming register file.

27. A method according to claim 23, wherein when an overflow occurs in said renaming register file, the data of all of said physical registers having the context ID of either one of the other contexts in an execution waiting state is saved to the register saving section of the corresponding context.

28. A method according to claim 23, wherein prior to loading the register data of the context which is being executed from said register saving section to said renaming register file, the data of said physical register having the context ID of either one of the other contexts in an execution waiting state is saved to the register saving section of the corresponding context.

29. A method according to claim 23, wherein the saving operation and the loading operation of the register data are executed on a renaming register unit basis.

30. A method according to claim 17, wherein said plurality of contexts are a plurality of processes which are executed in different address spaces.

31. A method according to claim 17, wherein said plurality of contexts are a plurality of threads which are executed in a same address space.

32. A method according to claim 31, wherein said thread is a loop of a numerical value calculating program.

33. A processor for simultaneously supplying a plurality of contexts to a pipeline and executing said contexts, comprising:
    a plurality of context storing sections, in each of which is stored one of the plurality of contexts as an execution unit for performing a function of a certain meaning, each of said contexts includes an instruction train having an attribute information field for storing not only a program code but also various information to assist the execution of said program code although a meaning of said program code is not changed, and instruction execution information necessary to execute a subsequent instruction serving as a timing for switching the context corresponding to the instruction train to another context which is being executed is provided in said attribute information field; and
    an instruction executing section for supplying the instruction train of each of said contexts to the pipeline and executing said instruction train and, when a vacancy of said pipeline is judged, for switching said context corresponding to the instruction train to another context which is being executed and for simultaneously executing said plurality of contexts, said instruction executing section including:
    at least two instruction storage buffers;
    a first router for switching a prefetch route during an instruction prefetch to prefetch the instruction train for one of said plurality of contexts to one of said instruction storage buffers;
    a second router for switching a fetch route during an instruction fetch to fetch the instruction train from one of said instruction storage buffers to said pipeline; and
    a context switching section which, when the instruction execution information is decoded from the attribute information of the instruction train corresponding to the context which is being supplied to the pipeline, said first router switches said prefetch route from a context on a switching destination side to one of the instruction buffers which is not being used for the instruction fetch, thereby allowing the instruction prefetch to be executed, and subsequently, when the execution of said subsequent instruction serving as the timing for switching to another context is judged, said second router switches said fetch route to the one of the instruction buffers to which the prefetch route was switched by said first router, thereby allowing the instruction of another context which has been prefetched to be fetched to the pipeline.

34. A processing method for a processor for simultaneously supplying a plurality of contexts to a pipeline and for executing said contexts, comprising:
    a forming step of forming a plurality of contexts as execution units each for performing a function of a certain meaning, each of said contexts includes an instruction train having an attribute information field for storing not only a program code but also various information to assist the execution of said program code although a meaning of said program code is not changed, and instruction execution information necessary to execute a subsequent instruction serving as a timing for switching the context corresponding to the instruction train to another context which is being executed is provided in said attribute information field; and
    an instruction executing step of supplying the instruction train of each of the contexts to the pipeline and executing said instruction train and, when a vacancy of said pipeline is judged, switching the context corresponding to the instruction train to another context which is being executed and simultaneously executing said plurality of contexts, said instruction executing step further includes the steps of:
    after prefetching the instruction train of the context being executed to an instruction buffer, fetching the instruction train to the pipeline and executing the instruction train;
    after decoding the instruction execution information from the attribute information of the instruction train of the context being executed, switching a prefetch route to prefetch the context on the switching destination side to an instruction buffer which is not being used for an instruction fetch; and
    subsequently, when the execution of said subsequent instruction serving as a timing for switching to another context is judged, fetching to the pipeline the instruction of another context which was prefetched to the instruction buffer.

* * * * *